F. M. BLAIN.
DRAWBAR HITCH FOR TRACTORS.
APPLICATION FILED JUNE 21, 1921.
1,414,770. Patented May 2, 1922.
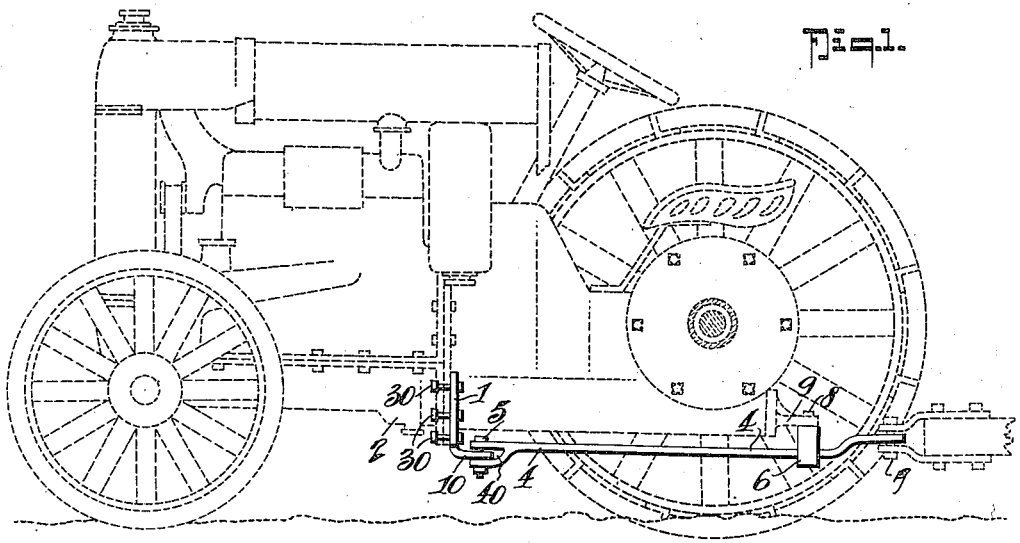
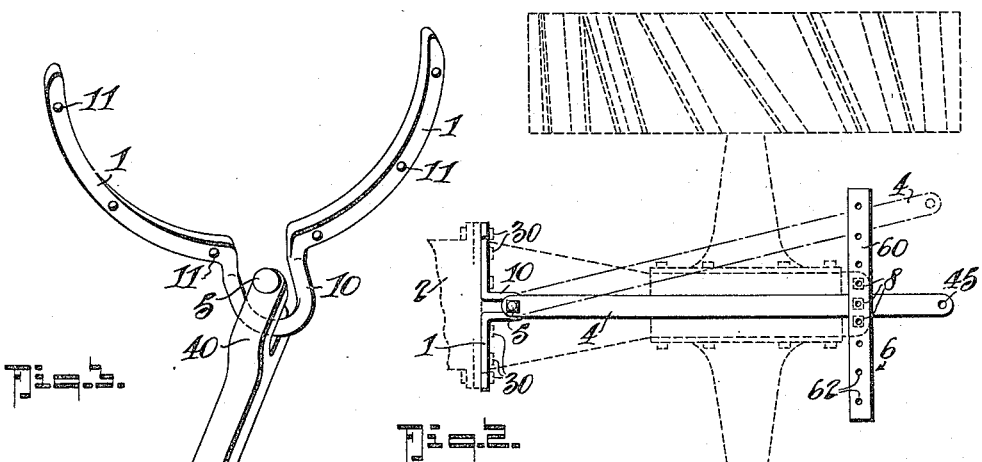
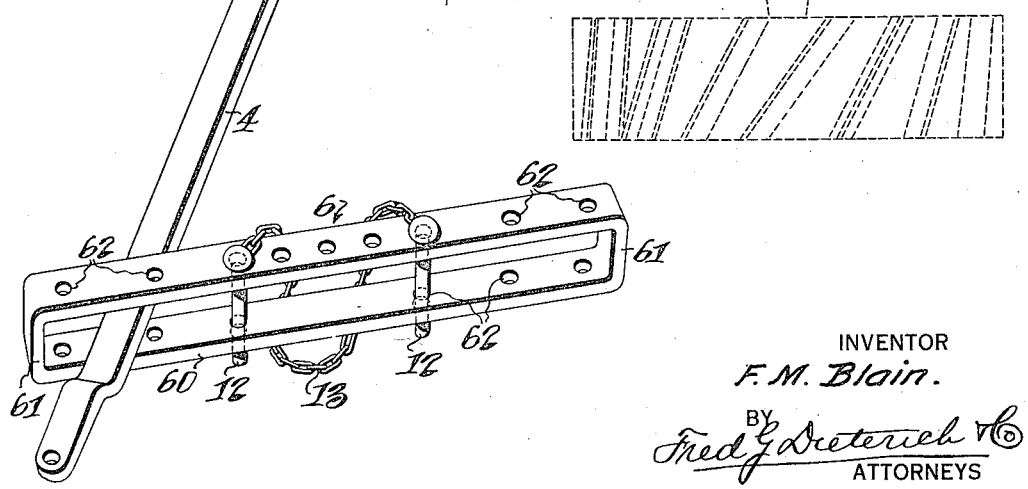
INVENTOR
F. M. Blain.
BY
Fred G. Dieterich & Co.
ATTORNEYS

UNITED STATES PATENT OFFICE.

FLOYD M. BLAIN, OF CENTRAL POINT, OREGON.

DRAWBAR HITCH FOR TRACTORS.

1,414,770.     Specification of Letters Patent.     Patented May 2, 1922.

Application filed June 21, 1921. Serial No. 479,337.

*To all whom it may concern:*

Be it known that I, FLOYD M. BLAIN, a citizen of the United States, residing at Central Point, in the county of Jackson and State of Oregon, have invented a new and Improved Drawbar Hitch for Tractors, of which the following is a specification.

This invention has reference to new and useful improvements in draw bar attachments for Fordson tractors and primarily has for its purpose to provide an attachment of the general character stated, of a simple and relatively inexpensive character and whose parts are so shaped that they may be made by a blacksmith without the need of any special tools, and which possesses the desired advantage in points of strength, durability, ease of application and efficiency.

Another and essential object of my invention is to provide a draft rigging for Fordson tractors in which the draw bar connection is designed for being secured directly to the rim of the crank case by substituting, in place of the usual six bolts that fasten the crank case rim, like bolts of sufficient length to pass through the said crank case rim and the draw bar connection, so that when the draw bar connection is thus applied the draft strain will come upon the rim of the crank case rather than direct upon the said bolt.

In its more complete nature, my invention comprehends an improved means for swivelly connecting the draw bar to the connection that is mounted on the crank case and for supporting the said swivelly coupled draw bar in such manner that it has a wide range of adjustment, with respect to its lateral swing, and a relatively flexible vertical movement whereby to avoid undue torsional twists or strains on the draw bar connection, and to allow the machine, drawn by the hitch, to trail directly behind the tractor or causing such machines or trailer to travel in an offset position with respect to the tractor, to the right or to the left, as the case may be, and thereby to sustain the draw bar that it may be readily swung to its right or left adjustments, as desired.

Further objects of my invention will be set forth in the following detailed description and my said invention consists of the peculiar features of construction and novel arrangement of parts, specifically pointed out in the appended claims and illustrated in the accompanying drawings, in which:—

Figure 1 is a side elevation of my draw bar hitch or draft rigging, so much of a tractor being shown as is necessary to indicate the operative mounting of my invention.

Figure 2 is a plan view of my improved draw bar hitch, a portion of the crank case and the transmission casing of the tractor being indicated to illustrate the relation of my improvement to such parts.

Figure 3 is a perspective view of my invention, the draw bar being indicated as swung to one of its lateral adjustments.

In the practical development of my invention, the connection that couples the draw bar to the tractor is in the nature of a half round or forked member 1 that is welded, at its lower or bottom edge, with an angled outwardly projected clevis 10.

The member 1 has each of its opposite portions formed with three apertures 11, and these apertures are so spaced that in fitting the member 1 up upon the rim 20 of the tractor crank case 2, they register with the usual apertures in the said rim through which the six bolts are passed when fitting the crank case end in place. In applying the member 1 to the crank case rim the usual six bolts that pass through the crank case rim are dispensed with and longer like bolts 30 are substituted, which bolts are sufficiently long to pass through the connecting member 1 and the crank case rim, as is clearly indicated on Figure 1 of the drawing.

The draw bar 4, in my present construction of hitch, has its forward end formed with a forked head 40 for freely slipping over the clevis 10 to which it is swivelly attached by a coupling pin bolt 5, it being understood from the drawing, the coupling connection that joins the draw bar to the clevis is such that the said bar 4, while having ample flexure to provide for readily swinging it to either of its lateral adjustments, also has sufficient flexure to allow for a limited vertical swing of the said bar 4, the reason for which will presently appear.

In my construction of hitch, the rear end of the draw bar extends through, is supported by, and has lateral adjustment in an elongated horizontal loop guide 6 that is shaped to form upper and lower parallel members 60—60 joined by solid end portions 61—61. The members 60—60 in my combined guide and support for the draw bar are sufficiently spaced apart to allow for a limited vertical movement of the draw bar and the outer or rear end of the draw bar has an aperture 45 for receiving the coupling pin bolt 7 that connects the bar to the tongue of the trailer see Figure 1.

The guide 6 is attached by a series of bolts 8, to the back end of the draw bar, with which the Fordson tractor is regularly equipped, as is clearly shown in Figures 1 and 2, and at the opposite ends the upper and lower members 60—60 of the guide 6 have sets of vertically aligning apertures 62—62 adapted for receiving the adjustable pins 12 for holding the bar 4 to either of its side vertical adjustments, and to provide against ready displacement of the pins 12, the two pins have a chain connection 13, as shown.

From the foregoing taken in connection with the accompanying drawing, the construction, the manner of its application, and the advantages of my invention will be readily apparent to those familiar with the manufacture and the use of draft rigging of the kind to which my said invention relates.

The construction of my hitch is such that the draw bar can be easily applied to the Fordson tractor, the connection being such that the bar passes under and behind the rear axle of the tractor and is coupled to the said tractor at a point substantially between the front and rear wheels thereof.

The connection is such that the angularity of connection between the tractor and the trailer is materially reduced in turning and since the draw bar has a substantially swiveled connection with the coupling yoke or member 1 and also has a limited free vertical play between the top and bottom members 60—60 of the slotted guide, the said bar has sufficient flexure to positively overcome snapping or breaking of the points of connection between the bar, its coupling with the tractor and with the trailer attachment, a danger that is always incident, due to the torsional strains, when the connections of the bar are practically rigid as against vertical movement thereof, and which is usually present in tractor hitches now in general use.

What I claim is:

A draw bar hitch for tractors, comprising a semi-circular member having bolt holes to match up with the bolt holes of the crank case of an engine and adapted to be secured thereto by the bolts which connect the crank case parts together, said semi-circular member having a loop projecting in a direction substantially at right angles to the plane of the semi-circular member, a draw bar having a bifurcated end, and a bolt for flexibly connecting said draw bar with said loop, a horizontally disposed guide loop adapted to be secured to the rear end of the tractor frame through which said draw bar projects, said guide loop having a series of pin holes, and stop pins held in said pins holes for the purposes specified.

FLOYD M. BLAIN.